US010473397B2

(12) United States Patent
College et al.

(10) Patent No.: US 10,473,397 B2
(45) Date of Patent: Nov. 12, 2019

(54) METHOD FOR THE USE OF HEAT ENERGY FROM GASIFICATION SOURCES IN GYPSUM BOARD PRODUCTION

(71) Applicant: CertainTeed Gypsum, Inc., Tampa, FL (US)

(72) Inventors: John W. College, Pittsburgh, PA (US); Felipe J. Yanes, Tampa, FL (US); David Corbin, Tampa, FL (US)

(73) Assignee: CertainTeed Gypsum, Inc., Tampa, FL (US)

( * ) Notice: Subject to any disclaimer, the term of this patent is extended or adjusted under 35 U.S.C. 154(b) by 199 days.

(21) Appl. No.: 13/763,757

(22) Filed: Feb. 11, 2013

(65) Prior Publication Data

US 2013/0212895 A1  Aug. 22, 2013

Related U.S. Application Data

(63) Continuation of application No. 12/277,555, filed on Nov. 25, 2008, now Pat. No. 8,371,038.

(51) Int. Cl.
*F26B 21/04* (2006.01)
*F26B 23/00* (2006.01)

(52) U.S. Cl.
CPC .......... *F26B 23/002* (2013.01); *F26B 23/001* (2013.01); *F26B 21/04* (2013.01); *Y02P 70/405* (2015.11)

(58) Field of Classification Search
CPC .......... Y02P 70/405; F26B 3/18; F26B 21/04; F26B 23/001; F26B 23/002
See application file for complete search history.

(56) References Cited

U.S. PATENT DOCUMENTS

| 2,677,237 | A | 5/1954 | Voysey |
| 4,974,334 | A * | 12/1990 | Roddewig ........................ 34/368 |
| 5,253,432 | A | 10/1993 | Raiko et al. |
| 5,797,332 | A | 8/1998 | Keller et al. |
| 8,371,038 | B2 | 2/2013 | College et al. |
| 2005/0050755 | A1 | 3/2005 | Majima |
| 2007/0172413 | A1 | 7/2007 | College |

FOREIGN PATENT DOCUMENTS

WO          9533169 A    12/1995

* cited by examiner

*Primary Examiner* — Jessica Yuen
(74) *Attorney, Agent, or Firm* — McDonnell Boehnen Hulbert & Berghoff LLP

(57) ABSTRACT

The present invention relates to an improved method for using heat energy in a gypsum board plant. More specifically, the method contemplates taking heat from a gasifier, or other alternative heat source, and using it to dry gypsum boards. In order to control humidity levels, this heat is delivered to one or more board dryers via a heat exchanger.

16 Claims, 2 Drawing Sheets

METHOD FOR THE USE OF HEAT ENERGY FROM GASIFICATION SOURCES IN GYPSUM BOARD PRODUCTION

RELATED APPLICATION DATA

This application is a continuation of and claims priority to application Ser. No. 12/277,555, filed Nov. 25, 2008, entitled Method for the Use of Heat Energy from Gasification Sources in Gypsum Board Production, now U.S. Pat. No. 8,371,038, issued Feb. 12, 2013, which itself claims priority to provisional patent Application Ser. No. 60/991,521, filed on Nov. 30, 2007, entitled "Method for the Use of Heat Energy from Gasification Sources in Gypsum Board Production". The contents of these applications are fully incorporated herein.

BACKGROUND OF THE INVENTION

Field of the Invention

This invention relates to a method for producing gypsum board. More particularly, the invention relates to a method of employing gasification technologies and/or low BTU fuel sources in a gypsum board dryer.

Description of the Background Art

Nearly 100% of all gypsum board production facilities use natural gas to meet the thermal requirements of the board plant. In a few rare cases oil is used as the energy source. The thermal energy is used for drying gypsum feed material, calcining the gypsum to hemihydrate, and drying the manufactured gypsum board.

Several techniques are used for drying the feed material these include, heating while grinding, running it through a heated cage mill (synthetic gypsum), drying rock in a rotary mill and simultaneously drying, grinding and calcining in a large mill. All of these techniques use direct fire methods where hot combustion gases are delivered to the gypsum.

There are also several techniques for calcining the gypsum. One method uses indirect heating of the gypsum in a kettle. A second uses the same concept but additionally uses a combustion method where the hot combustion gases are delivered to the material. A third method was mentioned above where rock is dried, ground, and calcined in one step. Yet another method starts will fine particle synthetic gypsum and flash calcines it in a hot mill. Again in all cases natural gas is the fuel of choice and direct contact of the hot gases and the gypsum is one of the preferred methods.

In gypsum board drying direct fired natural gas burners are used to deliver heat directly to wet gypsum boards as they continuously pass through a dryer. Typically gypsum boards are 25-33% moisture at the "wet" end of the dryer and less than 1% moisture at the dry end. Almost all of the water contained in the wet board is evaporated out of the board through the heat delivered from the combustion of natural gas in a natural gas burner. There is direct contact of this gas with humidified recirculated gas which is drawn over the wet gypsum boards causing them to heat up and allowing the evaporation of the water. The evaporated water becomes humidity in the now re-circulating combustion gases. It has been found that certain RH's in the dryer sections improve evaporation rates and the product board quality.

In general gypsum board dryers have three to four zones, each with re-circulating gas streams and each with certain desired relative humidity and temperatures. The gas burners are used to control the temperatures. The relative humidity is control by either venting the gas or by sucking the gas through the entirety of the dryer to the vent. It should be noted that there are high levels of gas re-circulation in each zone of the dryers throughout the entire dryer depending upon the design. Dryers which achieve high temperatures associated with high humidity's in their vents are typically the most efficient.

Thus, as noted, the production of gypsum board is energy intensive. Most of the energy is supplied from natural gas. The natural gas is burned to produce thermal energy required for drying the gypsum board. Modern gypsum board plants require around 200,000,000 BTU/hr. or approximately 200,000 cubic ft. of natural gas per hour. This is a tremendous amount of natural gas.

The large amount of natural gas required is problematic due to the tremendous instability in the natural gas market. High demand in 2005 to 2006 caused gas pricing to nearly quadruple in a few years. Last year gas pricing peaked at about $13.50/million BTU. By contrast, energy prices for coal/pet coke and biomass were generally less the $2.40/million BTU. Biomass has an additional advantage in that many conservation minded communities are now charging tipping fees to encourage the beneficial use of yard wastes and tree trimmings.

In view of the foregoing, there exists a need in the art for methods that use alternative energy sources or that make more efficient use of existing energy sources. One example is illustrated in U.S. Pat. No. 2,677,237 to Voysey. Voysey discloses a gas turbine power plant utilizing a sold water bearing fuel. The plant includes a number of fuel driers. The driers are in communication with a combustion chamber that, in turn, is in communication with a heat exchanger. The driers function in evaporating the water content from the fuel. The evaporated water can be heated via the heat exchanger prior to delivery into the combustion chamber.

Likewise, U.S. Pat. No. 5,253,432 to Raiko et al. discloses a drying method and dryer for use in a power-plant. More specifically, Raiko concerns a method for drying a water-consuming material in a power-plant process. Steam is collected from a dryer zone and passed to a combustion chamber or gasification device. The combusted steam is then utilized in a compressor and gas turbine.

Although the above reference inventions each achieve their respective objective, there continues to be a need in the art for a method of drying gypsum board that eliminates or minimizes the use of natural gas.

SUMMARY OF THE INVENTION

It is, therefore, one of the objects of this invention is to integrate gasification technologies with gypsum board production methods. Gasification technologies would include both atmospheric and high pressure as well as air and $O_2$ driven.

It is another object of this invention to provide a method for delivering clean heat to the dyer of a gypsum board plant, whereby unwanted coloring of the gypsum board is avoided.

Another object of this invention is to be able to utilize low BTU gas as a fuel source.

Still yet another object of this invention is to provide a method that utilizes the waste heat from an alternate source as the energy source for the gypsum board plant.

Thus, the present invention contemplates the use of gasification technologies in the drying of gypsum boards. This method allows for the combustion of the hot raw gas and the delivery and use of all of the energy produced on combustion. The energy produced can be used at multiple sites in the gypsum board plant. This would include the rock dryers, the synthetic gypsum dryers (cage mills), the calciners and the board driers. Thus any gasification process can be used at any energy consuming point in the board plant.

Another variation of this application would be in the direct use of low BTU gas. Some plants near to gypsum board plants have low BTU gas waste streams. Sometimes these waste streams are flared at the plant stack. The energy is wasted. An opportunity for use of these low BTU gas streams is allowed by this method. Low BTU gas if burned directly in the dryer causes a higher total gas volume to be drawn through the dryer.

For example 100 BTU/CF gas is about 90% non-combustible gases. It will take approximately 10 times as much (volume %) of the 100 BTU/CF gas to generate the amount of heat delivered by the combustion of 1000 BTU/CF gas. There is a critical balance between volumetric flow and humidity in the dryer. If the volumetric flow is too high the humidity will be lost and the gypsum board can be damaged on drying. The higher volumetric flow will also take energy to heat in general. In this variation the low BTU gas is burned the energy transferred to the board dryer by a heat exchanger, the dryer air is not diluted, and the residual energy in the combustion gas can be recovered either in the calcining processes or in the final zone of the dryer where humidity is less critical.

This method also allows for the case where waste heat from a neighboring plant can be recovered and used in the gypsum board plant. The waste heat can be in the form of a hot gas stream or in the form of steam. Either can be delivered to the heat exchangers as described above.

The advantages include allowing a system that traditionally used natural gas as the energy source to have an alternate fuel option. This method allows for the efficient use of energy from gasifiers, low BTU gas and gas waste heat. It also allows the gypsum board producer to have better control over the humidity in the board dryer as well as allowing the humidity's to actually be higher than when used with direct combustion of natural gas. The higher humidity's may allow higher drying temperatures without damaging the board thus allowing higher production rates or the reduction in size of the dryer. FIG. 1 shows how this is accomplished in the board dryer when steam is used as the heat source.

Another advantage of this concept is the ability of the system to use biomass as a fuel. Biomass is a renewable feed stock. In most cases it is an inexpensive fuel source and in some cases conservation minded communities there are charging tipping fees to encourage the beneficial use of yard wastes and tree trimmings.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to an improved method for using heat energy in a gypsum board plant. More specifically, the method contemplates taking heat from a gasifier, or other alternative heat source, and using it to dry gypsum boards. In order to control humidity levels, this heat is delivered to one or more board dryers via a heat exchanger. The various components of the present invention, and the manner in which they interrelate, will be described in greater detail hereinafter.

Figure 1:
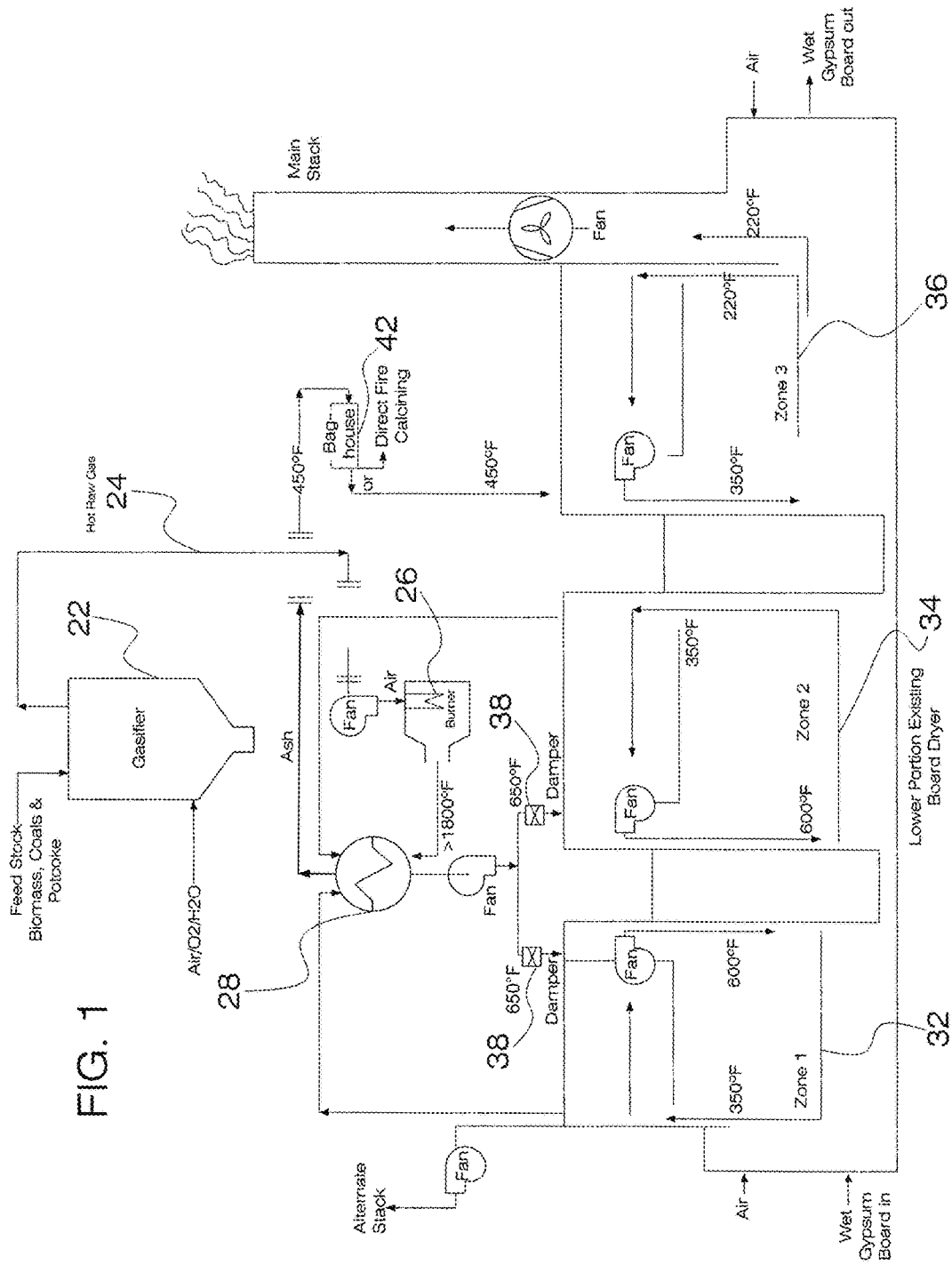
FIG. 1 is a schematic diagram illustrating the method of the present invention employing gasification sources in the production of gypsum boards.

The embodiment of the invention depicted in FIG. 1 is especially suited for biomass, such as yard or tree waste. However, this embodiment can be adapted to use other fuel sources. Whatever the fuel source, it is added to the gasifier 22 and is subsequently converted to CO and $H_2$ in the gasifier.

Biomass also produces a tremendous amount of pyrolysis liquor which is very high in BTU content. This pyrolysis liquid is in vapor phase in the hot raw gas that exits the gasifier at 24. The hot raw gas is burned in a traditional °burner 26 which, in turn, produces very hot gases (i.e. gases with temperatures exceeding 1800° F.). The pyrolysis liquids burn completely in burner 26. The resulting gas also contains the moisture that was contained in the biomass. This is typically 40-50% of the feed stock.

The hot combustion gases and moisture are directed to a heat exchanger 28 where the heat is exchanged with the gases from the first in a series of board dryers (32 and 34). Some gasifiers produce gas with BTU values as low as 100 BTU/CF. Direct combustion of this gas into the gypsum board dryer would produce a volumetric flow problem and change the dynamics of the gypsum board dryer considerably. A heat exchanger is, therefore, necessary.

The recycled gases from the board dryer enters the heat exchanger at a temperature of between 300-350° F. (and preferably 350° F.) and, by way of the heat exchanger, are heated to a temperature of approximately 650° F. The heated gases are then sent back to board dyers 32 and 34 via dampers 38. These heated gases are then used to withdraw moisture from gypsum boards passing through the first in a series of board dyers (32 and 34). Although the preferred embodiment only illustrates two zones, the heated gas can be passed to additional zones in the dryer as needed.

The combustion products and the moisture are cooled in heat exchanger 28 from about 1800° F. to approximately 450° F. This cooled combustion gas (450° F.) with high humidity content is an ideal candidate for introduction into the cooler dryer zones, such as dryer 36. The cooled gases in this step are passed through a baghouse 42 to remove residual carbon or ash which may discolor the board. Typically hot raw gases from these processes contain contaminants. These contaminants could be pyrolysis liquids, carbon particles and sometimes ash. If these contaminants are not completely consumed during combustion they could dirty the resulting board if not otherwise cleaned. Coloration is cause for rejection so it is very important the gas is clean.

Alternatively the 450° F. high moisture gas could be used to produce beta plaster by direct injection into a kettle or if pressurized a modified alpha hemi hydrate.

Figure 2:
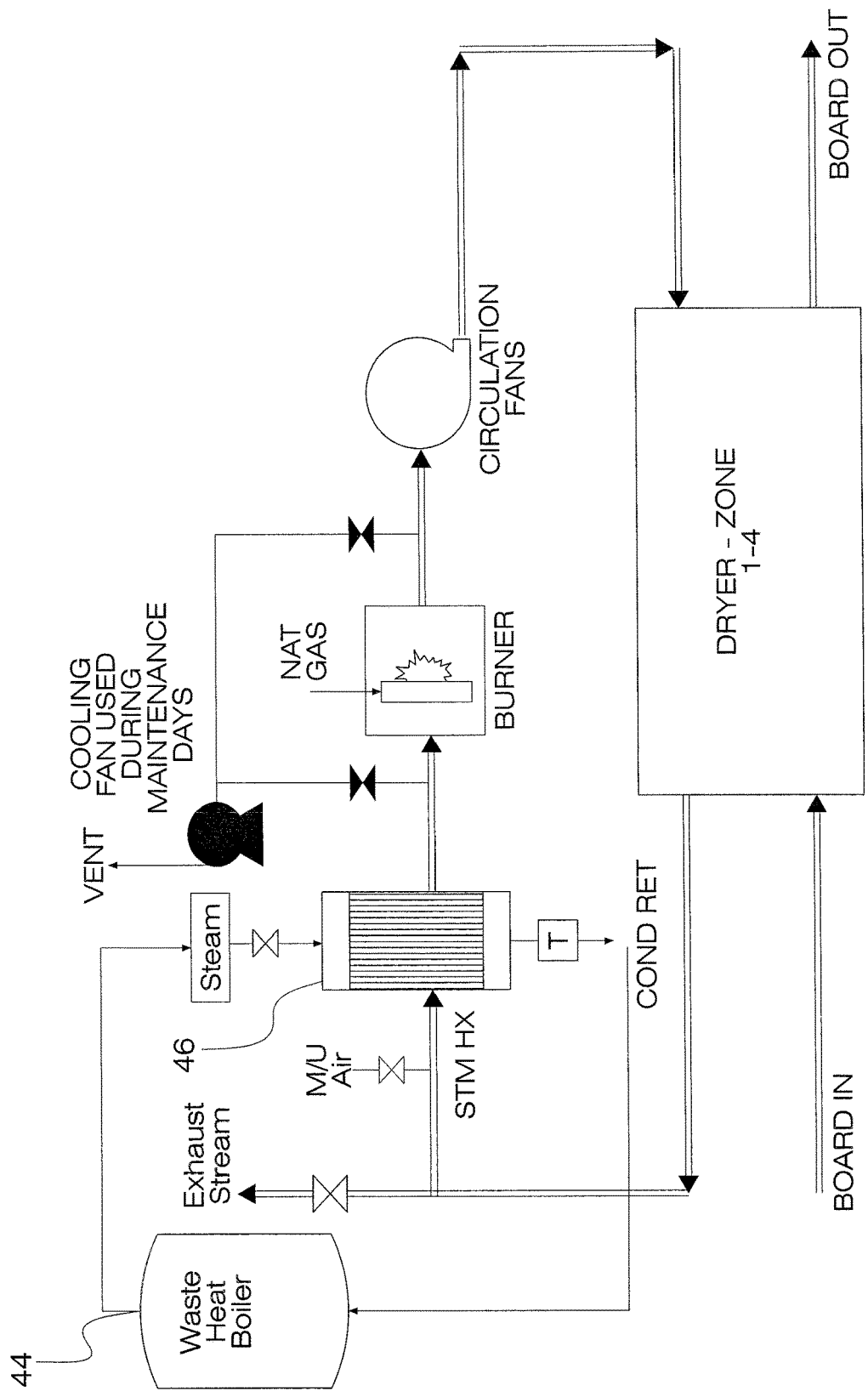
FIG. 2 is a schematic diagram illustrating an alternative embodiment of the present invention wherein waste heats are employed in the production of gypsum boards.

An alternative embodiment of the present invention illustrated in FIG. 2. This embodiment is the same in many respects to FIG. 1, however, it employs waste heat instead of heat from gasification. The waste heat is collected in a boiler 44. This heat is then passed through a heat exchanger 46 whereby it comes into contact with re-circulated gases from a dryer zone. The resulting humid, heated gas is then re-circulated into the dryer zone.

The improvements of the present invention over the traditional method are as follows.

Indirect heating through the use of heat exchanger allows the transfer of the heat without the dilution of the hot gases with combustion by-products or excess air used in combustion. This concept could allow very high temperatures and high humidity's in the hotter zones of the board dryer (1 & 2).

Air leaks into normal board dryers can cause severe energy loses and upset the energy balances. When the energy is delivered to recycle gases/humidified air a controlled amount of air will have to be injected to control the humidity. Air leakage will not cause major problems for the new process. It will, in fact, be necessary and controllable.

The combustion gases once passed through the heat exchanger still contain usable heat. This heat can be cleaned in a bag house and then delivered to the cooler zones of the dryer to finish off its use and to complete the drying of the board.

The combustion gases could also be used in the calciners or gypsum drying processes at the front-end of the board plant. The processes operate at fairly low temperatures. Direct injection of the gases into the calciner would be a very interesting application.

A unique opportunity exists when biomass is the energy feed stock. The unique opportunity entails the use of waste paper from the board plant as part of the feed material. A typical board plant will generate 3-5% waste board per year. The paper content of this waste board is about 5-6% and it can be separated substantially from the core gypsum. For a large scale plant approximately 5,000 tons of paper could be burned per year. The energy produced from gasifying this paper would be about 75,000,000,000 BTU's which is a significant quantity. This paper could be processed through the gasifiers or just burned prior to the gas combustion and added to the gas stream.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method for using a biomass to heat gypsum boards, the method comprising:
   providing an upstream and a downstream gypsum board dryer, the upstream board drying producing recycled gases having a temperature in excess of an ambient temperature;
   gasifying the biomass to produce a combustible vapor;
   burning the combustible vapor to produce a hot gas that is high in humidity;
   bringing recycled gases from the upstream board dryer into thermodynamic contact with the hot gas to produce a heated recycled gas and a cooled gas;
   routing the heated recycled gases back into the upstream board dryer; and
   routing the cooled gas into the downstream board dryer.

2. The method as described in claim 1 wherein the cooled gas is high in humidity.

3. The method as described in claim 1 wherein the step of gasifying the biomass produces a pyrolysis liquor in the vapor phase.

4. The method as described in claim 3 comprising the further step of burning the pyrolysis liquor to produce a hot gas that is high in humidity.

5. The method as described in claim 1 comprising the further step of removing residual carbon and ash from the cooled gas before it is routed into the downstream board dryer.

6. The method as described in claim 1, wherein the bringing the recycled gases from the upstream board dryer into thermodynamic contact with the hot gas is performed using a heat exchanger.

7. The method as described in claim 1, wherein the method includes gasifying paper waste together with the biomass.

8. The method as described in claim 7, the method further comprising separating paper from waste board to provide the paper waste.

9. The method as described in claim 1, wherein the recycled gases from the upstream board dryer are at a temperature between 300-350° F. when being brought into thermodynamic contact with the hot gas.

10. The method as described in claim 1, wherein the heated recycled gas produced by the thermodynamic contacting is at a temperature of approximately 650° F.

11. The method as described in claim 1, wherein the cooled gas produced by the thermodynamic contacting has a temperature of approximately 450° F.

12. The method as described in claim 1, wherein the hot gas has a temperature of about 1800° F. when being brought into thermodynamic contact with the recycled gases from the upstream board dryer.

13. The method as described in claim 1, wherein the cooled gas is high in humidity;
   wherein the step of gasifying the biomass produces a pyrolysis liquor in the vapor phase; and
   comprising the further step of removing residual carbon and ash from the cooled gas before it is routed into the downstream board dryer.

14. The method as described in claim 13, wherein the recycled gases from the upstream board dryer are at a temperature between 300-350° F. when being brought into thermodynamic contact with the hot gas.

15. The method as described in claim 13, wherein the method includes gasifying paper waste together with the biomass.

16. The method as described in claim 15, the method further comprising separating paper from waste board to provide the paper waste.

* * * * *